UNITED STATES PATENT OFFICE.

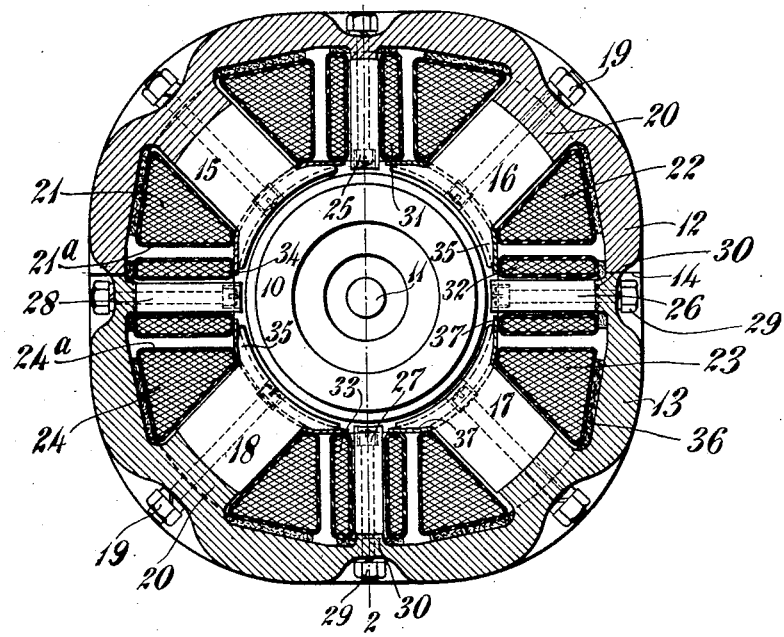
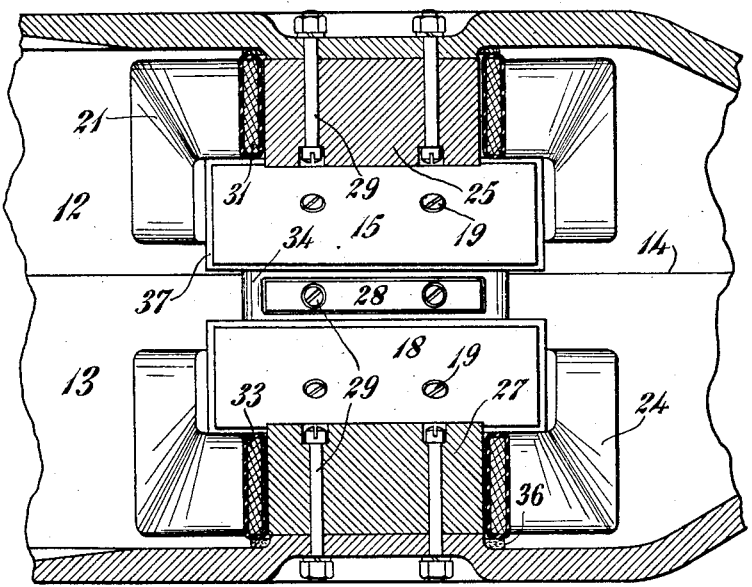

EMMETT W. STULL, OF MILWAUKEE, WISCONSIN, ASSIGNOR, BY MESNE ASSIGNMENTS, TO ALLIS-CHALMERS MANUFACTURING COMPANY, A CORPORATION OF DELAWARE.

DYNAMO-ELECTRIC MACHINE.

1,173,153. Specification of Letters Patent. Patented Feb. 22, 1916.

Application filed August 22, 1908. Serial No. 449,869.

*To all whom it may concern:*

Be it known that I, EMMETT W. STULL, a citizen of the United States, residing at Milwaukee, in the county of Milwaukee and State of Wisconsin, have invented certain new and useful Improvements in Dynamo-Electric Machines, of which the following is a full, clear, and exact specification.

My invention relates to the construction of dynamo-electric machines, and particularly to the construction of railway motors provided with commutating poles.

In many forms of dynamo-electric machines, it is essential that the space occupied be a minimum. My invention aims to accomplish this by so arranging the several parts of the machine that there is little or no waste space, and does so largely by making the field windings with their adjacent surfaces parallel and comparatively close together. When the machine is provided with commutating poles, which are now well known in the art and require no explanation here, the opposite sides of the windings for each commutating pole are parallel with each other and with the adjacent surfaces of the windings on the two adjacent main field poles. It is also generally desirable to make the field frames of stationary-field dynamo-electric machines in two parts. The plane of division between these two parts is almost universally between the main field poles. But ordinarily in any machine provided with commutating poles, and especially in multipolar machines, this plane of division coincides with the plane of the two commutating poles. My invention is intended to avoid this coincidence, which it does by attaching each of the commutating poles in its entirety to one part only of the main field frame. If desired, the plane of division of the main field frame may be so arranged that it just clears the commutating poles, or the two parts of the field frame may be notched to receive parts of the outer ends of the two commutating poles, which, however, are each attached to but one part of such field frame.

The novel feature of my invention will appear from the following description and accompanying drawing, and will be particularly pointed out in the claims.

Figure 1 is an end elevation of a dynamo-electric machine embodying my invention, the field yoke and field windings being shown in section; and Fig. 2 is a sectional view on the line 2—2 of Fig. 1, the armature being removed.

The armature 10, which may be of any desired construction, is mounted on the shaft 11. The stationary field frame comprises two parts 12 and 13, which are separated from each other along the plane 14. The machine shown is a four pole machine, two of the four main poles 15, 16, 17, and 18 being mounted on each part of the field frame. These poles are preferably laminated, and are fastened by bolts 19 to bosses 20 projecting inwardly from the field yoke. The main field poles are supplied with the main field windings 21, 22, 23, and 24, the adjacent surfaces of adjacent main field windings, as the surfaces 21$^a$ and 24$^a$, being substantially parallel. This makes the winding for each pole somewhat frusto-pyramidal in shape, the smaller end of the winding being adjacent to the armature.

Commutating poles 25, 26, 27, and 28 alternate in position with the main field poles. The commutating pole 25 is mounted on the upper part 12 of the field frame, while the commutating poles 26, 27, and 28 are mounted on the lower part 13 of said frame. These commutating poles are preferably non-integral with the field frame, being attached by bolts 29 to bosses 30 which project inwardly from the field frame. The plane of division 14 preferably just clears the commutating poles 26 and 28, thus allowing the part 12 of the field frame, together with the poles 15, 16, and 25 and their windings, to be lifted away from the lower part 13 and the parts mounted thereon. The commutating poles are provided with windings 31, 32, 33, and 34. Each of these windings preferably has its opposite sides parallel to each other and to the adjacent surfaces of the two main field windings between which it is located. Because these several surfaces are parallel, it is possible to reduce to a minimum the waste space within the machine, thus rendering the machine exceedingly compact. The main field poles have pole tips 35. Each of the commutating windings is clamped between the field yoke and the pole tips 35. Washers 36, preferably of some yielding material, may be placed between the coils and the yoke. If desired, each of the main field poles may be encircled by a sheet metal ring 37 just back of the pole tips. In such case, these rings extend between the pole tips of the main poles and the windings on the commutating poles.

Many modifications may be made in the precise arrangement here shown and described, and all such which do not depart from the spirit and scope of my invention I aim to cover in the following claims.

What I claim as new is:

1. In a dynamo-electric machine, a field structure comprising a yoke, main field poles extending therefrom and equally spaced about said yoke, said main field poles being provided with pole tips, commutating poles arranged alternately with respect to said main poles, windings on said poles, and means mounted on said pole tips and bearing against the windings of both sets of poles to hold said windings in place.

2. In a dynamo-electric machine, a field frame formed in two relatively separable parts, main field poles mounted on each of said parts, and commutating poles mounted on said parts, one pair of diametrically oppositely disposed commutating poles being mounted upon the same frame part.

3. In a dynamo-electric machine, a field frame formed in two relatively separable parts, a series of field poles mounted on said frame, the same number of poles of said series being mounted on each of said frame parts, a second series of field poles mounted on said frame, each pole of said latter series being located between and spaced from two adjacent poles of said first series, and one pair of diametrically oppositely disposed poles of said second series being mounted upon the same frame part.

4. In a dynamo-electric machine of the horizontal shaft type, a field frame formed in two parts, one of which is separable from the other by movement in an upward direction, a series of field poles mounted on said frame, the same number of poles of said series being mounted on each frame part, and a second series of field poles mounted on said frame and comprising a pair of diametrically oppositely disposed poles located between and spaced from two adjacent poles of said first series, said pair of diametrically opposite poles of said second series being mounted on the lower one of said frame parts with their axes extending in a substantially horizontal direction.

In testimony whereof I affix my signature, in the presence of two witnesses.

EMMETT W. STULL.

Witnesses:
H. C. CASE,
GEO. B. SCHLEY.

Copies of this patent may be obtained for five cents each, by addressing the "Commissioner of Patents, Washington, D. C."